(12) United States Patent
Janzen et al.

(10) Patent No.: US 7,705,063 B2
(45) Date of Patent: Apr. 27, 2010

(54) POLYURETHANE FOAM AND A RESIN COMPOSITION

(75) Inventors: Chris Janzen, Milton (CA); Greg Gardin, Cambridge (CA); Chris Lacarte, Blackie (CA); Katrina Schmidt, Oakville (CA)

(73) Assignee: BASF Aktiengesellschaft, Ludwigshafen (DE)

( * ) Notice: Subject to any disclaimer, the term of this patent is extended or adjusted under 35 U.S.C. 154(b) by 390 days.

(21) Appl. No.: 11/675,895

(22) Filed: Feb. 16, 2007

(65) Prior Publication Data

US 2008/0200574 A1    Aug. 21, 2008

(51) Int. Cl.
C08G 18/28 (2006.01)
C08G 18/48 (2006.01)
C08G 18/38 (2006.01)
C08G 18/78 (2006.01)
C08J 9/00 (2006.01)

(52) U.S. Cl. .......................... 521/114; 521/77; 521/99; 521/128

(58) Field of Classification Search ................. 521/114, 521/98, 99
See application file for complete search history.

(56) References Cited

U.S. PATENT DOCUMENTS

| 3,933,698 | A | 1/1976 | Fuzesi et al. |
| 4,555,418 | A | 11/1985 | Snider et al. |
| 5,091,434 | A * | 2/1992 | Suzuki et al. ................. 521/78 |
| 5,660,926 | A | 8/1997 | Skowronski et al. |
| 6,013,690 | A | 1/2000 | Coleman et al. |
| 6,534,556 | B2 * | 3/2003 | Lacarte et al. ............... 521/174 |
| 6,808,800 | B2 | 10/2004 | Tomasi |
| 6,919,384 | B2 * | 7/2005 | Yu ............................. 521/159 |
| 2006/0052468 | A1 | 3/2006 | Janzen |

* cited by examiner

*Primary Examiner*—Randy Gulakowski
*Assistant Examiner*—Kara Negrelli
(74) *Attorney, Agent, or Firm*—Howard & Howard Attorneys PLLC

(57) ABSTRACT

A polyurethane foam and a resin composition that may be used to form the polyurethane foam is provided. The resin composition comprises a first ethylene diamine-based polyol having about 100% ethylene oxide capping present in an amount of from 0.5 to 8 parts by weight based on 100 parts by weight of the resin composition, a second polyol, and a physical blowing agent. The polyurethane foam comprises the reaction product of an isocyanate component and the resin composition. A method of forming the polyurethane foam on a substrate, comprising the steps of combining the isocyanate component, the first ethylene diamine-based polyol having about 100% ethylene oxide capping, the second polyol, and the physical blowing agent to form a polyurethane composition is also provided. The polyurethane composition is applied onto the substrate at an ambient temperature of 0° C. or lower to form the polyurethane foam.

29 Claims, No Drawings

POLYURETHANE FOAM AND A RESIN COMPOSITION

BACKGROUND OF THE INVENTION

1. Field of the Invention

The subject invention generally relates to a polyurethane foam, a resin composition that may be used to form the polyurethane foam, and a method of forming the polyurethane foam on a substrate. More specifically, the subject invention relates to a resin composition including a combination of polyols that results in polyurethane foam having low surface friability, especially at low temperatures of less than or equal to 0° C.

2. Description of the Prior Art

Commercial and residential structures may be thermally and/or acoustically insulated by forming an insulating material, such as polyurethane foam, on the structures. The polyurethane foams comprise the reaction product of an isocyanate and a resin composition comprising a polyol or polyols, in the presence of a blowing agent.

To form the polyurethane foam on the structures, the resin composition and the isocyanate are combined in a mixing chamber of a spray gun to form a polyurethane composition. The polyurethane composition is then applied onto the commercial or residential structures to form the polyurethane foam through a polyol-isocyanate reaction. The polyurethane foam typically has an outer surface, a core, and an inner surface, which interfaces with the structures.

Unique problems arise when the polyurethane compositions are applied at low ambient temperatures, for example at less than or equal to 0° C., as is common during construction in cold climates. When the polyurethane compositions are applied at the low ambient temperatures, polyurethane foams have excessive surface friability and do not adhere well to structures. That is, the outer surface of the polyurethane foam crumbles and the inner surface of the polyurethane foams delaminates from the structures, thereby failing to provide adequate acoustic and thermal insulation.

The prior art has recognized various ways to decrease the surface friability of polyurethane foams, in general. For example, one way to decrease the surface friability of polyurethane foams is to increase the amount of catalyst used in the polyol-isocyanate reaction in an attempt to increase the speed of the polyol-ioscyanate reaction. However, the resulting polyurethane foam typically does not have enough cross-linking and will not foam to desired specifications.

Another way to decrease the surface friability of polyurethane foams is to select certain polyols for the resin composition. For example, as disclosed in U.S. Pat. No. 3,933,698 to Fuzesi et al., it is known in the art to form polyurethane foams comprising the reaction product of ethylenediamine-based polyols having ethylene oxide capping. Fuzesi et al. provides using from 8 to 50 parts by weight of an ethylene diamine-based polyol based on 100 parts by weight of total polyols used to form the polyurethane foam to achieve improved surface friability. The use of polyurethane foams comprising ethylene diamine-based polyols having ethylene oxide capping in the amounts set forth in Fuzesi et al. increases a polyol-isocyanate reaction temperature and conventional ozone-depleting blowing agents, such as hyrdrochlorofluorocarbons (HCFCs), are required to prevent scorching of the foam. Scorched foam is both aesthetically and functionally undesirable, as the scorched foam has excessive surface friability, separates from the substrate interface, and poses a fire risk. The conventional ozone-depleting blowing agents sufficiently cool the polyol-isocyanate reaction to prevent scorching.

However, new regulations, such as the Montreal Protocol on Substances That Deplete the Ozone Layer, statutorily mandate the phasing-out of ozone depleting agents, such as HCFCs, in favor of non-ozone depleting agents, such as hydrofluorocarbons (HFCs). The HFCs do not provide enough cooling to the polyol-isocyanate reaction, and the resulting foam often scorches.

Further, the polyurethane foams of Fuzesi et al. do not exhibit sufficiently low surface friability when the polyurethane composition used to form the polyurethane foam is sprayed at low ambient temperatures of less than or equal to 0° C. As such, there remains an opportunity to provide a polyurethane foam, a resin composition, and a method of forming the polyurethane foam on a substrate to remedy the surface friability and adhesion problems commonly experienced with such polyurethane foams, especially when the polyurethane composition used to form the polyurethane foam is applied at temperatures of less than or equal to 0° C.

SUMMARY OF THE INVENTION AND ADVANTAGES

The subject invention provides a polyurethane foam and a resin composition that may be used to form the polyurethane foam. The resin composition comprises a first ethylene diamine-based polyol, a second polyol, and a physical blowing agent. The first ethylene diamine-based polyol has about 100% ethylene oxide capping and is present in an amount of from 0.5 to 8 parts by weight based on 100 parts by weight of the resin composition. The polyurethane foam comprises the reaction product of an isocyanate component, the first ethylene diamine-based polyol, and the second polyol, in the presence of the physical blowing agent.

The subject invention also provides a method of forming the polyurethane foam on a substrate. The method comprises the steps of combining the isocyanate component, the first ethylene diamine-based polyol, the second polyol, and the physical blowing agent to form a polyurethane composition. The polyurethane composition is applied onto the substrate to form the polyurethane foam.

The polyurethane foam of the present invention has low surface friability and exhibits excellent adhesion when the polyurethane composition is applied to the substrate, especially when the polyurethane composition is applied at ambient temperatures of less than or equal to 0° C., and does not result in scorching of the polyurethane foam, even when hyrdofluorocarbon (HFC) blowing agents are used. Further, the polyurethane foam of the present invention exhibits excellent adhesion strength to the substrate, especially when the polyurethane composition is applied to the substrate at ambient temperatures of less than or equal to 0° C. Consequently, the polyurethane foam of the subject invention adheres to substrates without shrinking or crumbling even at ambient temperatures of less than or equal to 0° C.

DETAILED DESCRIPTION OF THE INVENTION

The subject invention provides a polyurethane foam, a resin composition that may be used to form the polyurethane foam, and a method of forming the polyurethane foam on a substrate. Typically, the polyurethane foam of the present invention is used for thermal and/or acoustic insulation applications; however, it is to be appreciated that the polyurethane foam of the present invention may be used for many other applications as well, especially for applications in which the polyurethane foam is formed at low temperatures of less than or equal to 0° C., for example during construction in cold climates. When used for thermal and/or acoustic insulation applications, the polyurethane foam may be formed on commercial and residential structures. The use of polyurethane foam reduces heat loss from commercial and residential structures and can be formed in-situ over irregular surfaces. Similarly, polyurethane foams may also be formed on pipes to provide rock shielding and/or insulative properties.

The polyurethane foam of the present invention comprises the reaction product of an isocyanate component, a first ethylene diamine-based polyol having about 100% ethylene oxide, and a second polyol in the presence of a physical blowing agent. The resin composition of the present invention typically comprises the first ethylene diamine-based polyol, the second polyol, and the physical blowing agent, as well as any other non-isocyanate component that may be used to form the polyurethane foam. However, it is to be appreciated that, with regard to the polyurethane foam itself, the manner in which the non-isocyanate components are combined with the isocyanate component is immaterial, and the present invention does not strictly require the presence of a discrete resin composition. For example, to form the polyurethane foam, all of the components can be simultaneously combined, in which case a separate "resin composition" may not be identified.

The isocyanate component may include any known aliphatic, cycloaliphatic, araliphatic and aromatic multivalent isocyanates, as well as combinations of any of those isocyanates. Specific examples of suitable isocyanates for the isocyanate component include alkylene diisocyantes with 4 to 12 carbons in the alkylene radical, such as 1,12-dodecane diisocyanate, 2-ethyl-1,4-tetramethylene diisocyanates, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate, as well as any mixtures of these isomers; 1-isocyanato-3,3,5-trimethyl-5-isocyanatomethylcyclohexane(isophorone diisocyanate), 2,4- and 2,6-hexahydrotoluene diisocyanate, as well as the corresponding isomeric mixtures 4,4', 2,2'- and 2,4'-dicyclohexylmethane diisocyanate. Additional specific examples may include aromatic diisocyanates and polyisocyanates, such as 2,4- and 2,6-toluene diisocyanate, the corresponding isomeric mixtures 4,4'-, 2,4'- and 2,2'-diphenylmethane diisocyanate, and the corresponding isomeric mixtures of 4,4'- and 2,4'-diphenylmethane diisocyanates and polyphenylenepolymethylene polyisocyanates (polymeric MDI), as well as mixtures of polymeric MDI and toluene diisocyanates. Preferably, the isocyanate component includes polymeric methyldiphenyl diioscyanate. A specific example of a polymeric methyldiphenyl diioscyanate that is suitable for the purposes of the subject invention is Lupranate® M20S, commercially available from BASF Corporation of Florham Park, N.J.

The isocyanate component is typically reacted with the resin composition at an isocyanate index of from 90 to 140, preferably from 95 to 135, most preferably from 105 to 130. The term "isocyanate index", as it is used herein, refers to a ratio of isocyanate groups to hydroxyl groups present in a polyurethane composition.

The first ethylene diamine-based polyol has about 100% ethylene oxide capping. More specifically, by "about" 100% ethylene oxide capping, it is meant that all intended capping of the first ethylene-diamine-based polyol is ethylene oxide capping, with any non-ethylene oxide capping resulting from trace amounts of other alkylene oxides or other impurities. As such, the capping is typically 100% ethylene oxide capping, but may be slightly lower, such as at least 99% ethylene oxide capping, depending on process variables and the presence of impurities during the production of the first ethylene diamine-based polyol. The about 100% ethylene oxide capping provides substantially all primary hydroxyl groups, which typically react faster than secondary hydroxyl groups. Similarly, the first ethylene diamine-based polyol having about 100% ethylene oxide capping typically reacts faster than a polyol having propylene oxide capping, as a propylene oxide-capped polyol is stearically hindered.

Suitable first ethylene diamine-based polyols have a hydroxyl value of from 400 to 1,000 mgKOH/g, more preferably of from 750 to 1,000 mgKOH/g, and most preferably of from 900 to 1,000 mgKOH/g. Suitable first ethylene diamine-based polyols also have a number average molecular weight of from 224 to 561 g/mol and a nominal functionality of 4. A specific example of the first ethylene diamine-based polyol that is suitable for the purposes of the subject invention is Mazeen® 184 (80) commercially available from BASF Corporation of Florham Park, N.J.

The first ethylene diamine-based polyol is present in an amount of from 0.5 to 8 parts by weight, more preferably from 1 to 7 parts by weight, and most preferably from 1 to 5 parts by weight based on 100 parts by weight of the resin composition or, alternatively, based on 100 parts by weight of all non-isocyanate components used to make the polyurethane foam. The first ethylene diamine-based polyol is preferably present in the aforementioned amount to impart the resulting polyurethane foam with excellent surface friability while preventing scorching of the foam from excessive polyol-isocyanate reaction speed and temperature, especially when hydrofluorocarbon (HFC) blowing agents are used as described in further detail below.

The second polyol may be selected from the group of mannich-based polyols, ethylene diamine-based polyols, sucrose polyols, polyester polyols, and combinations thereof. The second polyol typically has at least 75% propylene oxide capping. The second polyol tempers the effect of the first ethylene diamine-based polyol by providing secondary hydroxyl groups, which typically react slower than primary hydroxyl groups, and increases cross-linking of the polyurethane foam. Similarly, the second polyol typically reacts slower than a polyol having ethylene oxide capping, as a propylene oxide-capped polyol is stearically hindered.

Suitable second polyols have a hydroxyl value of from 300 to 700 mgKOH/g, more preferably of from 400 to 600 mgKOH/g, and most preferably of from 425 to 575 mgKOH/g. A specific example of the second polyol that is suitable for the purposes of the subject invention is Voranol™ R470X commercially available from Dow Chemical Company of Midland, Mich.

The second polyol is preferably present in an amount of from 20 to 45 parts by weight, more preferably of from 22 to 42 parts by weight, and most preferably of from 25 to 40 parts by weight based on 100 parts by weight of the resin composition or, alternatively, based on 100 parts by weight of all non-isocyanate components used to make the polyurethane foam. As such, the second polyol is typically present in greater amounts than the first ethylene diamine-based polyol to maintain excellent physical properties of the foam while other properties, such as surface friability and adhesion strength, are improved by the first ethylene diamine-based polyol.

As set forth above, the isocyanate component, first ethylene diamine-based polyol, and the second polyol are reacted in the presence of a physical blowing agent. The term "physical blowing agent", as it is used herein, refers to blowing agents that do not chemically react with the isocyanate component and/or polyol to provide a blowing gas. The physical blowing agent can be in a gaseous state at up to and including exotherm foaming temperatures. Alternatively, the physical blowing agent can be in a liquid state. The liquid physical blowing agent typically evaporates into a gas when heated, and will typically return to a liquid when cooled. Suitable physical blowing agents for the purposes of the subject invention may include hydrofluorocarbons (HFCs), cyclopentane, trans-1,2-dichloroethylene and combinations thereof. The most preferred physical blowing agents are typically HFCs, which have a zero ozone depletion potential.

Suitable HFC blowing agents include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142); and 1,1,3,3-pentafluoropropane (HFC-245fa). The most preferred HFC physical blowing agent is HFC-245fa.

The physical blowing agent is preferably present in an amount of from 5 to 30 parts by weight, and more preferably of from 12 to 14 parts by weight based on 100 parts by weight of the resin composition or, alternatively, based on 100 parts by weight of all non-isocyanate components used to make the polyurethane foam. At the above amounts, the HFC blowing agent provides sufficient polyol-isocyanate reaction cooling to prevent scorched foam while maintaining excellent physical properties of the foam, and allowing the first ethylene diamine-based polyol to improve other properties, such as surface friability and adhesion strength.

It is to be appreciated that a chemical co-blowing agent may also be present. The term "chemical co-blowing agent", as it is used herein, refers to blowing agents which chemically react with the isocyanate or with other components in polyurethane compositions to release a gas for foaming. A preferable example of the chemical co-blowing agent that is suitable for the purposes of the subject invention is water.

The polyurethane foam may further comprise a third polyol. The third polyol functions as a cross-linker and provides rigid segments in the resulting polyurethane foam. The third polyol may be selected from the group of polyester polyols, polyether polyols, and combinations thereof. The third polyol typically includes the polyester and/or polyether polyols and unreacted initiator polyols remaining after preparation of the polyester polyol and/or unesterified polyol, such as glycol.

Suitable polyester polyols for the purposes of the subject invention are produced by known methods, for example, from organic dicarboxylic acids with 2 to 12 carbons. Suitable polyester polyols can also be produced by polycondensation of organic polycarboxylic acids, for example, aromatic or preferably aliphatic polycarboxylic acids, and/or derivatives thereof, and multivalent alcohols in the absence of catalysts, preferably in an atmosphere of inert gas in the melt at temperatures of 150° C. to 250° C., and optionally under reduced pressure, up to the desired acid value, which is preferably less than 10. A specific example of a polyether polyol suitable for the purposes of the subject invention is Terate® 4020 commercially available from Invista™ of Wichita, Kans.

Suitable polyether polyols for the purposes of the subject invention can be produced by known methods, for example, by anionic polymerization with alkali hydroxides. The polyether polyols may have either primary or secondary hydroxyl groups. A specific example of a polyether polyol that is suitable for the purposes of the subject invention is Jeffol® R290 commercially available from Hunstman of The Woodlands, Tex.

The third polyol is preferably present in an amount of from 10 to 25 parts by weight, more preferably of from 12 to 20 parts by weight, and most preferably of from 11 to 18 parts by weight based on 100 parts by weight of the resin composition or, alternatively, based on 100 parts by weight of all non-isocyanate components used to make the polyurethane foam. At the above amounts, the third polyol provides sufficient cross-linking and rigid segments in the resulting polyurethane foam.

The polyurethane foam may also comprise a flame retardant. The flame retardant prevents foam scorching from the increased polyol-isocyanate reaction temperature caused by the higher reactivity of the primary hyrdroxyl groups provided by the first ethylene diamine-based polyol. Also, in the event of a fire after the polyurethane foam has been applied to the substrate, the flame retardant helps to retard fire progression. Suitable examples of flame retardants include tetrabromophthalate diol, tris(chloroisopropyl) phosphate, tricresyl phosphate, tris(2-chloroethyl) phosphate, and tris(2,3-dibromopropyl) phosphate. In addition to halogen-substituted phosphates, it is also possible to use inorganic or organic flame retardants, such as red phosphorus, aluminum oxide hyrdrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocylohexane, expandable graphite or cyanuric acid derivatives, for example, melamine, or mixtures of two or more flame retardants, for example, ammonium polyphosphates and melamine, and if desired, corn starch, or ammonium polyphosphate, melamine, and expandable graphite and/or, if desired, aromatic polyesters, in order to flame retard the isocyanate component. Specific examples of a flame retardant that is suitable for the purposes of the subject invention is PHT 4 diol, commercially available from Great Lakes Chemical Company of West Lafayette, Ind., and IXOL B-251, commercially available from Solvay Fluor GmbH of Hanover, Germany.

The flame retardant is preferably present in an amount of from 20 to 40 parts by weight, more preferably of from 22 to 38 parts by weight, and most preferably of from 25 to 35 parts by weight based on 100 parts by weight of the resin composition or, alternatively, based on 100 parts by weight of all non-isocyanate components used to make the polyurethane foam. The flame retardant is present in the above amounts to effectively prevent foam scorching from the increased polyol-isocyanate reaction temperature caused by the higher reactivity of the primary hyrdroxyl groups provided by the first ethylene diamine-based polyol.

The polyurethane foam may also comprise a surfactant. It is believed that the surfactant decreases surface tension of the polyurethane composition and contributes to increased flowability of the polyurethane composition. Examples of suitable surfactants include salts of sulfonic acids, for example, alkali metal salts or ammonium salts of fatty acids such as oleic or stearic acid, of dodecylbenzene- or dinaphthylmethanedisulfonic acid, and ricinoleic acid; foam stabilizers, such as siloxaneoxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil; and cell regulators, such as paraffins, fatty alcohols, and dimethylpolysiloxanes. A specific example of the surfactant that is suitable for the purposes of the subject invention is LK 221, commercially available from Air Products Corporation of Philadelphia, Pa.

The surfactant is preferably present in an amount of from 1 to 5 parts by weight, more preferably of from 1 to 4 parts by weight, and most preferably of from 1 to 3 parts by weight based on 100 parts by weight of the resin composition or, alternatively, based on 100 parts by weight of all non-isocyanate components used to make the polyurethane foam.

The polyurethane foam may also comprise the reaction product of a catalyst system. The catalyst system may include a curing catalyst, a blow catalyst, and combinations thereof. The catalyst system may be employed to accelerate the reaction of the isocyanate component and the resin composition. Curing catalysts also function to shorten tack time, promote green strength, and prevent foam shrinkage. Suitable curing catalysts are organometallic catalysts, preferably organo-lead catalysts, although it is possible to employ metals such as tin, titanium, copper, mercury, cobalt, nickel, iron, vanadium, antimony, bismuth, lithium, and manganese. Preferred curing catalysts are lead octoate and lead naphthanate. A specific example of a curing catalyst that is suitable for the purposes of the subject invention is Catalyst 320 commercially available from OMG of Cleveland, Ohio.

The curing catalyst is preferably present in an amount of from 0.1 to 5 parts by weight, more preferably of from 1 to 4 parts by weight, and most preferably of from 1 to 3 parts by weight based on 100 parts by weight of the resin composition or, alternatively, based on 100 parts by weight of all non-isocyanate components used to make the polyurethane foam.

As set forth above, blow catalysts may also be used. The blow catalysts promote urethane linkage formation. Suitable blow catalysts for the purposes of this invention include polyoxypropylenediamines, which include triethylamine and 3-methoxypropyldiamines, including triethylamine, 3-methoxypropydimethylamine, triethylenediamine, tributylamine, dimethylcyclohexylamine, dimethylbenzylamine, N-methyl-, N-ethyl- and N-cyclohexylmorpholine, N,N,N',N'-tetramethylethylenediamine, NN, N'N'-tetramethylbutanediamine or -hexanediamine, N,N,N'-trimethyl isopropyl propylenediamine, pentamethyldiethylenediamine, tetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane; and alkanolamine compounds, such as triethanolamine, triisopropanolamine, N-methyl- and N-ethyldiethanolamine and dimethylethanolamine.

Another type of blow catalyst that may be suitable for this invention is a tertiary amine ether catalyst. Suitable tertiary amine ether blow catalysts may include, but are not limited to, N,N,N,N'''-tetramethyl-2,2'-diaminodiethyl ether; 2-dimenthyaminoethyl- 1,3-dimenthylamineo-propyl ether; and N,N-dimorpholinoethyl ether. A specific example of the blow catalyst that is suitable for the purposes of the subject invention is DABCO® R80-20 commercially available from Air Products of Philadelphia, Pa.

The blow catalyst is preferably present in an amount of from 1 to 7 parts by weight, more preferably of from 2 to 6 parts by weight, and most preferably of from 2 to 5 parts by weight based on 100 parts by weight of the resin composition or, alternatively, based on 100 parts by weight of all non-isocyanate components used to make the polyurethane foam.

The subject invention also includes a method of forming the polyurethane foam on the substrate. The substrate may be, but is not limited to, wood, concrete, polyvinyl chloride, metal, and acetyl butyl styrene. The method comprises the steps of combining the isocyanate component, the first ethylene diamine-based polyol, the second polyol, and the physical blowing agent, among other components as set forth above, to form the polyurethane composition, and applying the polyurethane composition onto the substrate to form the polyurethane foam. It is to be appreciated that reaction between the isocyanate component and the polyols begins upon combination of these components. As such, the polyurethane composition typically comprises at least some polyurethane chains that comprise the reaction product of the isocyanate component and one or more of the polyols. However, the polyurethane composition includes unreacted isocyanate and polyols present in a sufficient amount to allow spray application of the polyurethane composition.

Typically, the polyurethane composition is applied onto the substrate by spraying, preferably using a fixed ratio proportioning system. The fixed ratio proportioning system typically includes a resin composition supply vessel, an isocyanate component supply vessel, a spray machine, and a spray gun having a mixing chamber. The resin composition is pumped in a first stream from the resin composition supply vessel to the spray machine. The isocyanate component is pumped in a second stream separate from the resin composition, from the isocyanate component supply vessel to the spray machine. The isocyanate component and resin composition are heated and pressurized in the spray machine and supplied to the spray gun in two separate heated hoses to form the polyurethane composition. The polyurethane composition is then provided to the spray gun, which is used to mix the isocyanate component and the resin composition and spray the polyurethane composition onto the substrate.

The physical blowing agent may be added to the resin composition at the spray machine as a third stream; blended into the resin composition supply vessel immediately prior to dispensing; or may be pre-blended into the resin composition, stored, and shipped in the resin composition supply vessel to a manufacturer of polyurethane foams.

The spray machine is typically and preferably a fixed proportioner machine with two positive displacement pumps, one for the isocyanate component and one for the resin composition. The spray machine typically heats the isocyanate component and the resin composition up to a desired temperature, typically of from 26-66° C., and pressurizes the isocyanate component and the resin composition to a pressure of from 4,000 to 20,400 kPa. The spray machine typically delivers the isocyanate component and the resin composition through separate hoses to the spray gun with the mixing chamber. A spray operator may spray the polyurethane foam onto the substrate, such as wood, concrete, polyvinyl chloride, metal, and acetyl butyl styrene.

For the purposes of the subject invention, the polyurethane composition may be applied to the substrate at an ambient temperature of less than or equal to 0° C. to form the polyurethane foam. More specifically, the term "ambient temperature", as it is used herein, refers to the air temperature in a space between the nozzle of the spray gun and the substrate. As set forth above, ambient temperatures of less than or equal to 0° C. are common during construction in cold climates. The resulting polyurethane foam typically has an outer surface, a core, and an inner surface, which interfaces with the substrate. The resulting polyurethane foam is typically a rigid polyurethane foam that has a closed-cell content of at least 80% as measured in accordance with ASTM D 6226-98. The polyurethane foam typically has an in-place density of less than 3.0 pcf as measured in accordance with ASTM D 1622-98.

Even at the ambient temperature of less than or equal to 0° C., the outer surface of the polyurethane foam will typically not crumble and the inner surface of the polyurethane foam will typically not pull away from the substrate. That is, the resulting polyurethane foam typically has excellent surface friability, i.e. very low surface friability. One indicator of excellent surface friability is a field test in which an individual runs a hand across the polyurethane foam and observes crumbling of the polyurethane foam. Absence of visible crumbling is indicative of excellent surface friability. Similarly, the resulting polyurethane foam typically has an adhesion strength of at least 7 kPa as measured in accordance with ASTM test method D1621-94. Additionally, polyurethane foams of the present invention generally exhibit excellent adhesion to many common substrates such as wood, concrete, polyvinyl chloride, metal, and acetyl butyl styrene to form strong composites. Due to the excellent adhesion, the polyurethane foams resist separation from the substrate.

EXAMPLES

The following examples are meant to illustrate the invention and are not to be viewed in any way as limiting to the scope of the invention.

The fixed ratio proportioning system used in these examples comprises a resin composition supply vessel, an isocyanate component supply vessel, a spray machine, and a spray gun having a mixing chamber. The resin composition is pumped in a first stream from the resin composition supply vessel to the spray machine, and from the spray machine to the spray gun. The isocyanate component is pumped in a second stream, separate from the resin composition, from the isocyanate component supply vessel to the spray machine, and from the spray machine to the spray gun. The physical blowing agent is blended into the resin composition supply vessel by an end-use manufacturer.

The spray machine is a fixed proportioner machine with two positive displacement pumps, one for the isocyanate component and one for the resin composition. The spray machine heats the isocyanate component and the resin composition to a temperature of about 49° C. and pressurizes the isocyanate component and the resin composition to a pressure of about 7,000 kPa. The spray machine delivers the isocyanate component and the resin composition through separate hoses to the mixing chamber of the spray gun. A spray operator sprays the polyurethane foam onto a wood substrate.

The polyurethane composition is applied to the wood substrate at an ambient temperature of −10° C. to form the polyurethane foam.

The specific amounts of each component in the resin composition are indicated below in Table 1, wherein all amounts are in parts by weight based on the total weight of the resin composition.

TABLE 1

| | Example 1 | Example 2 |
|---|---|---|
| Components | | |
| Polyol A | 5.00 | 1.00 |
| Polyol B | 27.93 | 35.01 |
| Polyol C | 6.50 | 6.12 |
| Polyol D | 10.00 | 7.50 |
| Polyol E | 0.00 | 1.00 |
| Flame retardant A | 10.00 | 10.00 |
| Flame retardant B | 20.00 | 20.00 |
| Surfactant A | 1.00 | 1.00 |
| Surfactant B | 1.00 | 1.00 |
| Surfactant C | 0.00 | 1.00 |
| Curing catalyst A | 1.20 | 0.00 |
| Curing catalyst B | 1.20 | 1.20 |
| Blow catalyst A | 2.45 | 2.45 |

TABLE 1-continued

| | Example 1 | Example 2 |
|---|---|---|
| Blowing agent A | 12.00 | 12.00 |
| Blowing agent B | 1.72 | 1.72 |
| Total | 100.00 | 100.00 |
| Isocyanate component A | | |
| Index | 106 | 130 |

Polyol A is an ethylene diamine-based polyol having about 100% ethylene oxide capping, a hydroxyl value of from 925 to 975, a number average molecular weight of from 224 to 561 g/mol, and a nominal functionality of 4, commercially available from BASF Corporation of Florham Park, N.J.

Polyol B is mannich-based polyol with a hydroxyl value of from 400 to 450 and a degree of propoxylation of 75%, commercially available from Dow Chemical Company of Midland, Mich.

Polyol C is a polyether triol commercially available under the tradename Jeffol® R290 from Hunstman of The Woodlands, Tex.

Polyol D is a polyester polyol commercially available under the tradename Terate® 4020 from Invista™ of Wichita, Kans.

Polyol E is a polyester polyol commercially available under the tradename Terol® 258 from Oxid L.P. of Houston, Tex.

Flame retardant A is a tetrabromophthalate diol commercially available from Great Lakes Chemical Company of West Lafayette, Ind.

Flame retardant B is tris-(chloroisopropyl)phosphate.

Surfactant A is a cell-stabilizing surfactant commercially available under the tradename LK 221 from Air Products Corporation of Philadelphia, Pa.

Surfactant B is commercially available under the tradename DABCO® DC5604 from Air Products of Philadelphia, Pa.

Surfactant C is castor oil.

Curing catalyst A is a dibutyl tin dialkyl acid from Air Products of Allentown, Pa.

Curing catalyst B is a catalyst solution containing bismuth 2-ethylhexoate commercially available from OMG of Cleveland, Ohio.

Blow catalyst A is an amine catalyst commercially available under the tradename DABCO® R80-20 from Air Products of Philadelphia, Pa.

Blowing agent A is 1,1,1,3,3-pentafluoropropane.

Blowing agent B is water.

Isocyanate component A is polyphenylenepolymethylene polyisocyanate (polymeric MDI) commercially available as Lupranate® M20S from BASF Corporation of Florham Park, N.J.

The resin composition of Table 1 is sprayed in the 1:1 volume ratio with the isocyanate component through the fixed ratio proportioning system described above. The resin composition and the isocyanate component react to form the polyurethane composition and resulting polyurethane foam.

Table 2 below lists the approximate physical properties for a sample of the resulting polyurethane foam having the dimensions 150 mm×50 mm×50 mm. The sample is tested in accordance with ASTM D 1622-98 "Standard Test Method for Apparent Density of Rigid Cellular Plastics", ASTM D1621-94 "Standard Test Method for Compressive Properties of Rigid Cellular Plastics" and ASTM D 6226-98 "Standard Test Method for Open Cell Content of Rigid Cellular Plastics". Adhesion strength of the sample is not tested at a failure threshold, but rather as long as the adhesion strength is greater than or equal to 7 kPa, the sample is deemed acceptable. Similarly, a closed cell percentage of the sample is not specifically determined, but is definitively greater than 90%.

TABLE 2

| Components | Example 1 | Example 2 |
|---|---|---|
| Density | 32 kg/m$^3$ | 40 kg/m$^3$ |
| Surface Friability | No crumbling | No crumbling |
| Compressive Strength | 216 kPa | 250 kPa |
| Closed Cell (%) | >90% | >90% |
| Adhesion Strength | >7 kPa | >7 kPa |

Comparative Examples

Comparative Examples of polyurethane foam are prepared for comparison to a polyurethane foam of the present invention. The polyurethane foam is similarly formed from a reaction product of an isocyanate component and a resin composition in the presence of a physical blowing agent.

The polyurethane foam is formed and sprayed using the same apparatus and method as set forth in the above Examples.

The specific amounts of each component in the resin composition are indicated below in Table 3, wherein all amounts are in parts by weight based on the total weight of the resin composition.

TABLE 3

|  | Comp. Ex. 1 | Comp. Ex. 2 |
|---|---|---|
| Components |  |  |
| Polyol A | 0.00 | 0.00 |
| Polyol B | 32.93 | 36.01 |
| Polyol C | 6.50 | 6.12 |
| Polyol D | 10.00 | 7.50 |
| Polyol E | 0.00 | 1.00 |
| Flame retardant A | 10.00 | 10.00 |
| Flame retardant B | 20.00 | 20.00 |
| Surfactant A | 1.00 | 1.00 |
| Surfactant B | 1.00 | 1.00 |
| Surfactant C | 0.00 | 1.00 |
| Curing catalyst A | 1.20 | 0.00 |
| Curing catalyst B | 1.20 | 1.20 |
| Blow catalyst A | 2.45 | 2.45 |
| Blowing agent A | 12.00 | 12.00 |
| Blowing agent B | 1.72 | 1.72 |
| Total | 100.00 | 100.00 |
| Isocyanate |  |  |
| Index | 106 | 130 |

The resin compositions of Table 3 are sprayed in a 1:1 volumetric ratio with the isocyanate component through the fixed ratio proportioning system described for the Examples. The polyurethane composition of Comparative Examples 1 and 2 is applied to a wood substrate at an ambient temperature of −10° C. to form the polyurethane foam. The resin composition and the isocyanate component react to form the polyurethane composition and resulting polyurethane foam.

Table 4 below lists the approximate physical properties for a sample of the resulting polyurethane foam having the dimensions 150 mm×50 mm×50 mm. The sample is tested in accordance with ASTM D 1622-98 "Standard Test Method for Apparent Density of Rigid Cellular Plastics", D1621-94 "Standard Test Method for Compressive Properties of Rigid Cellular Plastics" and ASTM D 6226-98 "Standard Test Method for Open Cell Content of Rigid Cellular Plastics". Adhesion strength of the sample is not tested at a failure threshold, but rather as long as the adhesion strength is greater than or equal to 7 kPa, the sample is deemed acceptable. Similarly, a closed cell percentage of the sample is not specifically determined, but is definitively greater than 90%.

TABLE 4

| Components | Comp. Ex. 1 | Comp. Ex. 2 |
|---|---|---|
| Density | 32 kg/m$^3$ | 40 kg/m$^3$ |
| Surface Friability | Crumbling | Crumbling |
| Adhesion Strength | Loss of adhesion | Loss of adhesion |
| Closed Cell (%) | >90% | >90% |
| Compresive Strength | 216 kPa | 250 kPa |

Analysis Of Results

As is apparent through comparison of the physical properties of the polyurethane foam of the present invention, as illustrated by Examples 1-2, to the physical properties of the polyurethane foam as illustrated by Comparative Examples 1-2, the polyurethane foam of the present invention exhibits low surface friability at ambient temperatures of less than or equal to 0° C. In contrast, the polyurethane foam of the Comparative Examples exhibits high surface friability at ambient temperatures of less than or equal to 0° C. Similarly, the polyurethane foam of the present invention exhibits high adhesion strength at ambient temperatures of less than or equal to 0° C., whereas the polyurethane foam of the Comparative Examples exhibits low adhesion strength at ambient temperatures of less than or equal to 0° C. Consequently, the polyurethane foams of the present invention are more suitable than the polyurethane foams of the Comparative Examples for many applications that require decreased surface friability and high adhesion strength for polyurethane foams applied at ambient temperatures of less than or equal to 0° C.

Obviously, many modifications and variations of the present invention are possible in light of the above teachings. The invention may be practiced otherwise than as specifically described within the scope of the appended claims.

The invention claimed is:

1. A resin composition comprising:
    a first ethylene diamine-based polyol having about 100% ethylene oxide capping and present in an amount of from 0.5 to 8 parts by weight based on 100 parts by weight of said resin composition;
    a second polyol; and
    a physical blowing agent.

2. A resin composition as set forth in claim 1 wherein said second polyol comprises a polyol having at least 75% propylene oxide capping.

3. A resin composition as set forth in claim 2 wherein said second polyol is present in an amount of from 20 to 45 parts by weight based on 100 parts by weight of said resin composition.

4. A resin composition as set forth in claim 1 wherein said physical blowing agent is selected from the group of hydrofluorocarbons, cyclopentane, and combinations thereof.

5. A resin composition as set forth in claim 1 wherein said physical blowing agent comprises a hydrofluorocarbon.

6. A resin composition as set forth in claim 4 wherein said physical blowing agent is present in an amount of from 5 to 30 parts by weight based on 100 parts by weight of said resin composition.

7. A resin composition as set forth in claim 1 further comprising a third polyol.

8. A resin composition as set forth in claim 7 wherein said third polyol is present in an amount of from 10 to 25 parts by weight based on 100 parts by weight of said resin composition.

9. A resin composition as set forth in claim 1 further comprising a flame retardant.

10. A resin composition as set forth in claim 9 wherein said flame retardant is present in an amount of from 20 to 40 parts by weight based on 100 parts by weight of said resin composition.

11. A resin composition as set forth in claim 1 further comprising a surfactant.

12. A polyurethane foam comprising a reaction product of:
an isocyanate component;
a first ethylene diamine-based polyol having about 100% ethylene oxide capping and present in an amount of from 0.5 to 8 parts by weight based on 100 parts by weight of all non-isocyanate components used to make said foam; and
a second polyol;
in the presence of a physical blowing agent.

13. A polyurethane foam as set forth in claim 12 wherein said second polyol comprises a polyol having at least 75% propylene oxide capping.

14. A polyurethane foam as set forth in claim 13 wherein said second polyol is present in an amount of from 20 to 45 parts by weight based on 100 parts by weight of all non-isocyanate components used to make said foam.

15. A polyurethane foam as set forth in claim 12 wherein said physical blowing agent is selected from the group of hydrofluorocarbons, cyclopentane, and combinations thereof.

16. A polyurethane foam as set forth in claim 12 wherein said physical blowing agent comprises a hydrofluorocarbon.

17. A polyurethane foam as set forth in claim 15 wherein said physical blowing agent is present in an amount of from 5 to 30 parts by weight based on 100 parts by weight of all non-isocyanate components used to make said foam.

18. A polyurethane foam as set forth in claim 12 further comprising a third polyol.

19. A polyurethane foam as set forth in claim 18 wherein said third polyol is present in an amount of from 10 to 25 parts by weight based on 100 parts by weight of all non-isocyanate components used to make said foam.

20. A polyurethane foam as set forth in claim 12 further comprising a flame retardant.

21. A polyurethane foam as set forth in claim 20 wherein said flame retardant is present in an amount of from 20 to 40 parts by weight based on 100 parts by weight of all non-isocyanate components used to make said foam.

22. A polyurethane foam as set forth in claim 12 further comprising a surfactant.

23. A polyurethane foam as set forth in claim 12 wherein said polyurethane foam has an adhesion strength of at least 7 kPa after application at an ambient temperature of less than or equal to 0° C.

24. A polyurethane foam as set forth in claim 12 wherein said isocyanate component is further defined as polymeric methyldiphenyl diisocyanate.

25. A polyurethane foam as set forth in claim 12 wherein said polyurethane foam is further defined as a rigid foam having a closed-cell content of at least 80%.

26. A polyurethane foam as set forth in claim 12 wherein said polyurethane foam has an in-place density of less than 3.0 pcf.

27. A method of forming a polyurethane foam on a substrate, said method comprising the steps of:
combining:
an isocyanate component;
a first ethylene diamine-based polyol having about 100% ethylene oxide capping and present in an amount of from 0.5 to 8 parts by weight based on 100 parts by weight of all non-isocyanate components used to make the foam; and
a second polyol;
a physical blowing agent to form a polyurethane composition; and
applying the polyurethane composition onto the substrate to form the polyurethane foam.

28. A method as set forth in claim 27 wherein the polyurethane composition is applied at an ambient temperature of less than or equal to 0° C. to form the polyurethane foam.

29. A method as set forth in claim 28 wherein the polyurethane foam has an adhesion strength of at least 7 kPa.

* * * * *